Aug. 23, 1932.   J. F. FLANAGAN   1,873,749
PLOW ATTACHMENT FOR TRACTORS
Filed Jan. 7, 1931    2 Sheets-Sheet 2

WITNESSES
William P. Goebel.
L. B. Marshall

INVENTOR
J. F. Flanagan
BY Munn & Co,
ATTORNEYS

Patented Aug. 23, 1932

1,873,749

UNITED STATES PATENT OFFICE

JOHN F. FLANAGAN, OF NAPA, CALIFORNIA, ASSIGNOR OF ONE-HALF TO CHARLES E. THURSTON, OF MONTCLAIR, NEW JERSEY

PLOW ATTACHMENT FOR TRACTORS

Application filed January 7, 1931. Serial No. 507,275.

One of the objects of the invention is to provide a plow attachment for tractors adjustable relatively to a tractor to permit of the movement of the plow attachment with reference to growing plants, vines and trees for their cultivation and without danger of injury to their roots.

Another object of the invention is to position the plow attachment where it may be viewed by the driver of the tractor so that the distance between the path of the plow attachment and the plants may be estimated as the tractor is steered on its course.

Still another object of the invention is to provide convenient means to raise the plow attachment relatively to the tractor when the plow attachment is adjacent a plant, vine or tree. Preferably the plow attachment has a frame which is pivoted to the tractor and means are provided for raising the frame relatively to the tractor.

A further object of the invention is to provide means to regulate the plow attachment to make a furrow of the desired depth.

Additional objects of the invention will appear in the following specification in which the preferred form of the invention is described.

Figure 1:
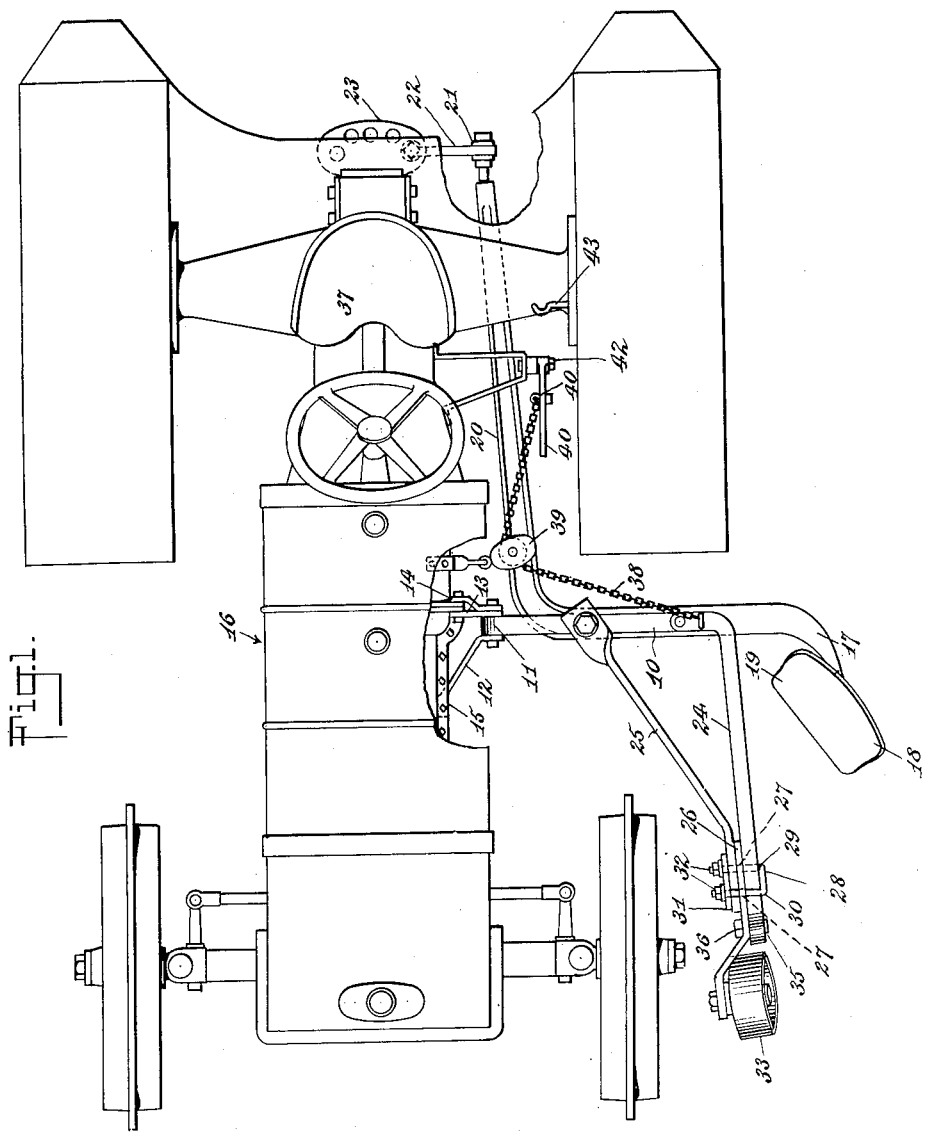
Figure 2:
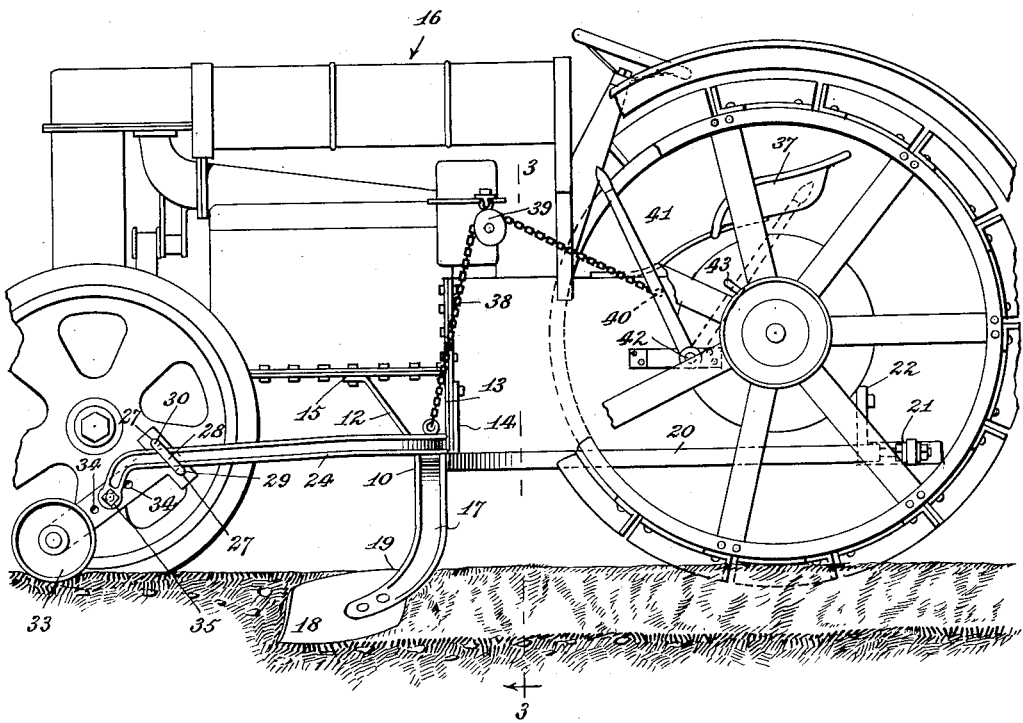
Figure 3:
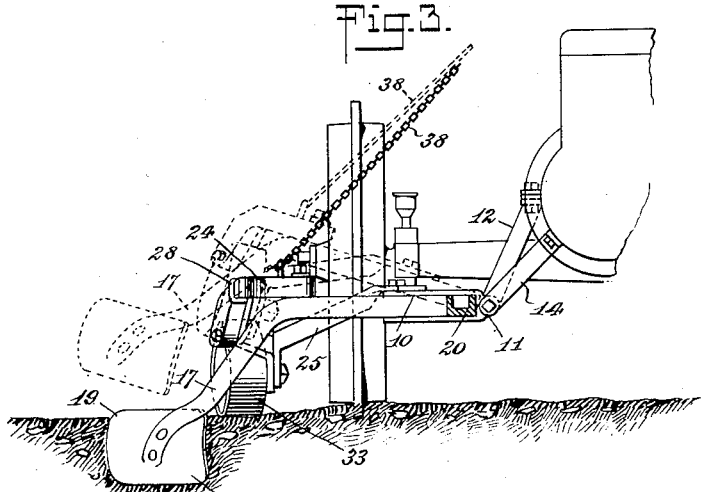

In the drawings similar reference characters refer to similar parts in the several views, of which Figure 1 is a plan view illustrating a tractor provided with the plow attachment, parts being broken away to show the construction, Figure 2 is a fragmentary side elevation of the tractor with the plow attachment, and Figure 3 is a fragmentary sectional view on the line 3—3 of Figure 2.

It will be understood that while the attachment is shown as applied to a tractor, the attachment may be mounted on vehicles of various types to obtain the desired results.

By referring to the drawings it will be seen that a frame 10 is provided having its inner end 11 journaled in bearings in brackets 12, 13 and 14 which are bolted to the frame 15 of a tractor 16. It will be seen by referring to the drawings, that the bracket 12 is secured to a bolt in a horizontally extending series of bolts on the tractor and that the brackets 13 and 14 are secured to bolts in a vertically extending series of bolts on the tractor, which makes it possible to brace the bearing 11 opposite a share 18 and without altering or reconstructing the tractor in any way. The outer end 17 of the frame depends, as best illustrated in Figures 2 and 3, and is provided with a share 18 and a mold board 19. Bolted to the frame 10 and extending rearwardly therefrom there is a frame member 20, the rear end of which is journaled in a bearing 21 on a bracket 22 which extends laterally from and is bolted to the draw-bar of the tractor 16. Inasmuch as the bearing 11 is secured by the brackets 12, 13 and 14 to bolts on the tractor and as the bearing 21 is secured to the draw-bar 23, it will be understood that the device may be mounted on the tractor quickly and without altering the tractor. The bearing 21 is in alignment with the bearing 11 so that the frame 10 with its frame member 20 may be raised to lift the share 18 with its mold-board 19 from the ground.

Secured to the frame 10 and extending forwardly therefrom, there are frame members 24 and 25 between the forward ends of which there is disposed a bracket 26 on which the wheel 33 is mounted. This bracket 26 has apertures 27 through which the terminals of a U-shaped bolt 28 extend, one of the terminals 29 of the U-shaped bolt extending under the frame members 24 and 25 and the other terminal 30 of the U-shaped bolt extending above the frame members 24 and 25. The terminals then extend through apertures in a plate 31 and their threaded ends are engaged by nuts 32 which press washers against the plate 31 in a manner readily understood.

This means is provided for holding the ends of the frame members 24 and 25 braced and secured to the bracket members 26 to adjustably hold the bracket members 26. The bracket 26 serves, therefore, to support the wheel 33 in adjusted position relatively to the frame members 24 and 25 and the frame 10. As additional means of securing the wheel 33 and the bracket 26 in position, there are apertures 34 in the bracket 26 and a bolt 35 is disposed through an aperture in the frame member 24 and through one of the apertures 34 and is engaged by a nut 36 for securing the bolt 35 in position.

It will be seen by referring to Figure 1 of the drawings, that the driver of the tractor will be seated in the seat 37 and that the share 18 and the wheel 33 will be in a position to be viewed with reference to the path of the tractor and the plants, vines and trees which are to be cultivated, but which are not to be injured by the share 18. When desired the plow share 18 may be raised from the ground by means of the chain or cable 38 which is secured to the frame 10 and is disposed through a block 39 with its terminal 40 secured to a lever 41 pivoted at 42. By raising the lever 41 the frame 10 will be raised to move on its pivots 11 and 21 which will serve to lift the share 18 clear of the ground, together with the wheel 33. When desired, the lever 41 may be moved for engagement by the hook 43 which will serve to keep the share 18 and the wheel 33 raised above the ground until the attachment is to be employed.

As will best be seen by referring to the drawings, the wheel 33 does not rotate on an axis parallel with the axes of the wheels of the tractor and the wheel 33 will, therefore, not run true. This will assist in freeing the wheel from dirt sticking to it, for as the wheel 33 regulates the depth of the cut made by the share 18, if dirt should stick to the wheel 33 the share 18 would not cut as deep as desired. It will also be understood that a gang of plows may be drawn by the tractor and discs may be secured at the rear of the gang of plows. Furthermore, it will be understood that one of the discs may be so arranged as to push back the dirt which has been plowed by the share 18. It will also be understood that the attachment may be secured to either side of the tractor, or any other desired vehicle, and that while a share 18 is shown for cultivating the ground, any other type of cultivating tool may be employed.

What is claimed is:

1. In a device of the class described, a main frame having ground engaging means for movement thereover, a second frame mounted at a side of the main frame and having two members spaced apart, a bracket disposed between the two members, there being apertures in the bracket, a U-shaped bolt having one threaded terminal disposed above the members and another threaded terminal disposed below the members with the terminals disposed in the apertures in the bracket, a plate having apertures, the plate being disposed against the outer side of one of the members, with the threaded terminals disposed in the apertures, nuts meshing with the threaded terminals and engaging the outer side of the plate, and a wheel mounted on the bracket.

2. In a device of the class described, a main frame having ground engaging means for movement thereover, a second frame mounted at a side of the main frame and having two members spaced apart, a bracket disposed between the two members, there being apertures in the bracket, a U-shaped bolt having one threaded terminal disposed above the members and another threaded terminal disposed below the members, with the terminals disposed in the apertures in the bracket, a plate having apertures, the plate being disposed against the outer side of one of the members, with the threaded terminals disposed in the apertures, nuts meshing with the threaded terminals and engaging the outer side of the plate, a wheel mounted on the bracket, and additional means for securing the bracket to one of the members.

3. In a device of the class described, a main frame having ground engaging means for movement thereover, a second frame mounted at a side of the main frame and having two members spaced apart, a bracket disposed between the two members, there being apertures in the bracket, a U-shaped bolt having one threaded terminal disposed above the members and another threaded terminal disposed below the members, with the terminals disposed in the apertures in the bracket, a plate having apertures, the plate being disposed against the outer side of one of the members, with the threaded terminals disposed in the apertures, nut meshing with the threaded terminals and engaging the outer side of the plate, a wheel mounted on the bracket, an end of one of the members beyond the U-shaped member extending downwardly, there being an aperture in the said end of the member, there being another aperture in the bracket, and a bolt disposed in the last two mentioned apertures.

4. In a device of the class described, a main frame, supporting wheels mounted on the main frame, a second frame adjustably mounted on the main frame, a soil engaging wheel mounted on the second mentioned frame on an axis at an angle to the axes of the supporting wheels, and a cultivator secured to the second mentioned frame.

5. In a device of the class described, a main frame having ground engaging means for movement thereover, a second frame mounted at a side of the main frame and having two members, a bracket disposed at the two members, there being apertures in the bracket, a U-shaped member having a terminal disposed above the members and another terminal disposed below the members, with the terminals disposed in the apertures in the bracket, means engaging the terminals of the U-shaped member for holding the two members and the bracket relatively to each other, and a wheel mounted on the bracket.

6. In a device of the class described, a main frame having ground engaging means for movement thereover, a second frame mounted at a side of the main frame and having two members converging forwardly, a bracket disposed at the forward ends of the said two members, there being apertures in the bracket, a U-shaped member having one terminal disposed above the members and its other terminal disposed below the members, with the terminals disposed in the apertures in the bracket, means engaging the terminals of the U-shaped member for holding the two members and the bracket relatively to each other, and a wheel mounted on the bracket.

7. In combination with a tractor having a draw-bar and a vertically extending series of bolts and a horizontally extending series of bolts, a frame disposed at the side of the tractor and having two bearings spaced apart, brackets secured to the bolts in the vertically and horizontally extending series of bolts and having a bearing member journaled in one of the bearings on the frame, a bracket secured to the draw-bar and having a bearing member journaled in the other bearing on the frame, a cultivator on the frame opposite the first mentioned brackets and in advance of the draw-bar, and a soil engaging member on the frame in advance of the cultivator.

8. In combination with a tractor having a draw-bar and bolts, a frame disposed at the side of the tractor and having two bearings spaced apart, a plurality of brackets secured to the bolts and having a bearing member journaled in one of the bearings on the frame, a bracket secured to the draw-bar and having a bearing member journaled in the other bearing on the frame, a cultivator on the frame opposite the first mentioned brackets and in advance of the draw-bar, the frame having members converging forwardly, a bracket disposed at the forward ends of the said two members, there being apertures in the bracket, a U-shaped member having one terminal disposed above the members and another terminal disposed below the members, with the terminals disposed in the apertures in the bracket, means engaging the terminals of the U-shaped member for holding the two members and the bracket relatively to each other, and a wheel mounted on the bracket.

9. In combination with a tractor having a draw-bar and bolts, a frame disposed at the side of the tractor and having two bearings spaced apart, a plurality of brackets secured to the bolts and having a bearing member journaled in one of the bearings on the frame, a bracket secured to the draw-bar and having a bearing member journaled in the other bearing on the frame, and a cultivator on the frame opposite the first mentioned brackets and in advance of the draw-bar.

JOHN F. FLANAGAN.